Jan. 22, 1935.  C. W. HANSELL  1,988,622
OSCILLATORY CIRCUIT
Original Filed May 1, 1931
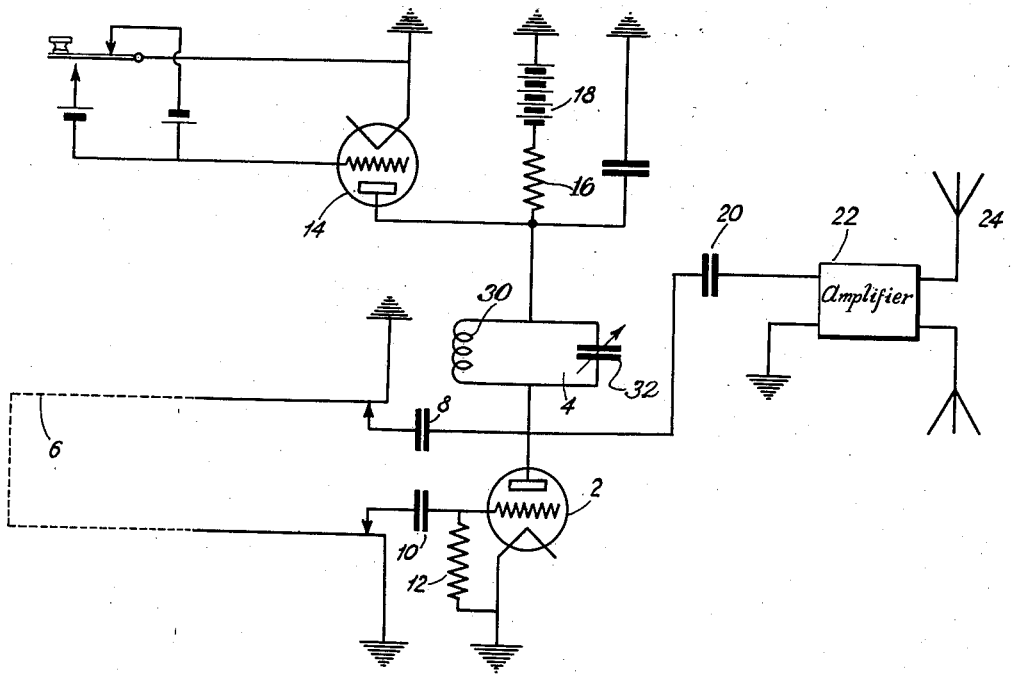
INVENTOR
CLARENCE W. HANSELL
BY *H.S. Grover*
ATTORNEY Patented Jan. 22, 1935

1,988,622

UNITED STATES PATENT OFFICE 1,988,622

OSCILLATORY CIRCUIT

Clarence W. Hansell, Port Jefferson, N. Y., assignor to Radio Corporation of America, a corporation of Delaware Original application May 1, 1931, Serial No. 534,255. Divided and this application June 6, 1932, Serial No. 615,642

8 Claims. (Cl. 250—36)

This case is a division of my copending application Serial Number 534,255, filed May 1, 1931, entitled "Oscillatory circuits".

In my copending application, Serial Number 400,489, filed in the United States Patent Office October 18, 1929, I have described a system employing a resonant transmission line for frequency control whereby the frequency of oscillations generated by the generator is maintained constant. The frequency controlling action of the line may be attributed to the fact that the line forms the equivalent of a sharply tuned resonant circuit whose reactance changes rapidly with change of frequency and which change of reactance may be utilized to keep the frequency of an oscillator relatively constant.

It is an object of my present invention to provide an oscillation generator having resonant transmission line control, wherein the transmission line is grounded at both of its ends.

That is to say, it is the main purpose of my present invention to provide an improved oscillation generator having resonant transmission line frequency control wherein the line is grounded at a plurality of points, in particular, at both ends adjacent the electron discharge device which it is to frequency control.

My present invention is more fully described in connection with the attached drawing which illustrates a long transmission line controlled oscillation generator, the long transmission line being made up of two straight, substantially parallel conductors, adjacent ends of which are grounded.

Turning to the drawing, an electron discharge device oscillator 2 has in its output circuit a tunable circuit 4. Tuned circuit 4 has inductance in the form of an inductance coil 30 and capacity in the form of a variable condenser 32. Oscillation generation is maintained by feed back through the interelectrode capacity of the device 2 as well as transfer of energy through the long resonant transmission line 6 grounded at both of its ends as shown, and coupled to the anode of device 2 through direct current blocking, but high frequency passing condenser 8 and to the grid of device 2, through a similar direct current backing and high frequency passing condenser 10. The grid is maintained at a suitable bias by the action of resistor 12.

As described more fully in my copending application referred to, standing waves, on the long transmission line 6 whose conductors are preferably shielded so as to prevent radiation and energy pick-up, pull the oscillations generated by the oscillator 2 to a frequency corresponding to the resonance frequency of the line for the conditions under which it is operated. As the ends of the line are grounded, the tapping points to the anode and grid should be adjusted at a distance away from the grounding points whereby optimum operating conditions are obtained. That is, by adjusting the tap at the input ends of the line, which ends may be considered near the line grounding points, the amount of oscillating current in the line may be adjusted. Usually an adjustment such that the useful output from the oscillator together with the losses in the line will put normal load on the vacuum tube will be found desirable. The amount of grid excitation will be adjusted to the normal value by adjusting the tap on the grid end of the line. The exact adjustment of frequency, after all other adjustments are made, will be made by varying the length of the line or the tuning of the anode circuit 4.

By keying or modulating the input circuit of electron discharge device 14, varying currents may be caused to flow through electron discharge device 14 and through impedance 16 in series with the anode potential source 18. Consequently, output energy appearing in tunable circuit 4, because of the varying anode potential applied to the anode of electron discharge device 2 will become modulated. The modulated oscillations may be fed directly to an antenna and radiated or, if desired, may be fed either by inductive coupling or through a blocking condenser 20 as shown, to a power amplifier system 22 which may contain frequency multipliers, and then radiated by a suitable antenna 24. Of course, if desired, the modulation may also be introduced in the amplifier system.

If desired, a radio frequency choke may be used in series with the grid leak 12, and also, if desired, a by-pass condenser may be connected in parallel with the resistor.

Having thus described my invention, what I claim is:

1. An oscillation generator comprising an electron discharge device having an anode, a cathode, and a control electrode, an output circuit coupled to said anode, and, a resonant transmission line a plurality of half wave lengths long at a desired operating frequency for controlling the frequency of oscillations generated by said oscillator coupled near its ends to electrodes of said device, said long resonant line being grounded at both its ends.

2. An electron discharge device oscillator having an anode, a cathode, and a control electrode, a resonant line greater than a half wave length long at a desired operating frequency grounded at both its ends and coupled near its grounded ends capacitively to said anode and control electrode, and, a tunable circuit connected to said anode.

3. An electron discharge device oscillator having an anode, a cathode, and a control electrode, a resonant line greater than a half wave length long at a desired operating frequency grounded at both its ends and coupled near its grounded ends capacitively to said anode and said control electrode, a tunable circuit connected to said anode, means for modulating the oscillations set up in said tunable circuit, and, means for transmitting the modulated oscillations.

4. An electron discharge device oscillator comprising an electron discharge device having an anode a cathode and a control grid, a looped transmission line, many half wave lengths long at a desired operating frequency coupled near its adjacent ends to electrodes of said electron discharge device, and, means for grounding said adjacent input ends of said line.

5. An electron discharge device oscillator comprising an electron discharge device having an anode a cathode and a control electrode, a conductor, long, relative to a desired operating wave length, said conductor having adjacent ends and having substantially uniformly distributed inductance and capacity, means for grounding the two adjacent ends of said conductor, and means for capacitively coupling points on said conductor adjacent said grounded ends to, respectively, the control electrode and anode of said electron discharge device oscillator.

6. An oscillation generator comprising an electron discharge device having a cathode a grid and anode electrodes, a circuit having lumped inductance coupled to a pair of electrodes of said device, and, a circuit having uniformly distributed inductance and capacity coupled to a pair of electrodes of said device, said last mentioned circuit consisting of a linear conductor greater than one-half wave length long at a desired operating frequency looped upon itself once.

7. Apparatus as claimed in the preceding claim characterized by the fact that the ends of said looped conductor electrically nearest the electrodes to which they are coupled are grounded.

8. An oscillation generator comprising an electron discharge device having an anode a cathode and a grid, a resistance connected across said grid and cathode, a tuned circuit comprising an inductance coil shunted by a condenser connected between said anode and said cathode, a conductor, long, relative to a desired operating wave length looped upon itself once so that it has two portions substantially parallel and linear, the adjacent free ends of said conductor being grounded, and condensers connecting the anode and grid of said device to different points on said conductor which points are relatively near to the grounded ends of said conductor.

CLARENCE W. HANSELL.